United States Patent [19]

Muthusamy

[11] Patent Number: 5,862,065
[45] Date of Patent: Jan. 19, 1999

[54] METHOD AND CIRCUIT FOR FAST GENERATION OF ZERO FLAG CONDITION CODE IN A MICROPROCESSOR-BASED COMPUTER

[75] Inventor: Karthikeyan Muthusamy, Austin, Tex.

[73] Assignee: Advanced Micro Devices, Inc., Sunnyvale, Calif.

[21] Appl. No.: 799,452

[22] Filed: Feb. 13, 1997

[51] Int. Cl.[6] .................................................. G06F 7/00
[52] U.S. Cl. .......................................................... 364/736.5
[58] Field of Search .......................................... 364/736.5

[56] References Cited

U.S. PATENT DOCUMENTS

| | | | |
|---|---|---|---|
| 3,983,382 | 9/1976 | Weinberger | 364/736.5 |
| 4,044,338 | 8/1977 | Wolf . | |
| 4,453,212 | 6/1984 | Gaither et al. . | |
| 4,807,115 | 2/1989 | Torng . | |
| 4,815,019 | 3/1989 | Bosshart | 364/736.5 |
| 4,858,105 | 8/1989 | Kuriyama et al. . | |
| 4,924,422 | 5/1990 | Vassiliadis et al. | 364/736.5 |
| 4,928,223 | 5/1990 | Dao et al. . | |
| 5,053,631 | 10/1991 | Perlman et al. . | |
| 5,058,048 | 10/1991 | Gupta et al. . | |
| 5,129,067 | 7/1992 | Johnson . | |
| 5,136,697 | 8/1992 | Johnson . | |
| 5,226,126 | 7/1993 | McFarland et al. . | |
| 5,226,130 | 7/1993 | Favor et al. . | |
| 5,367,477 | 11/1994 | Hinds et al. | 364/736.5 |
| 5,581,496 | 12/1996 | Lai et al. | 364/736.5 |
| 5,586,069 | 12/1996 | Dockser | 364/736.5 |
| 5,604,689 | 2/1997 | Dockser | 364/736.5 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4, 1994.
Michael Slater, "AMD's K5 Designed to Outrun Pentium," —Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.

Primary Examiner—Tan V. Mai
Attorney, Agent, or Firm—Conley, Rose & Tayon; Robert C. Kowert; B. Noel Kivlin

[57] ABSTRACT

An adder circuit in parallel with a zero flag generation circuit. In a preferred embodiment, an arithmetic logic unit (ALU) circuit in a microprocessor based computer system includes an adder circuit preferably adapted to receive first and second operands. The preferred adder circuit is further adapted to produce a result equal to the sum of the first and second operands. The ALU circuit further includes a zero flag generation circuit. The zero flag generation circuit is adapted to receive the first and second operands in parallel with the adder circuit and to produce a zero flag signal in response to the operands. The zero flag signal is indicative of whether the sum of the operands is equal to zero. In one embodiment, the zero flag generation circuit includes N half adders in parallel wherein each adder receives a bit from the first operand and a corresponding bit from the second operand. Each half adder produces a sum bit and a carry bit in response to the inputs. Preferably, the zero flag generation circuit further includes N-1 Exclusive OR (EXOR) gates. Each of the N-1 EXOR gates receives one bit of the N sum bits and a corresponding bit of the N carry bits as inputs. The N-1 outputs from the EXOR gates, together with an inverted least significant sum bit, are routed to a logic circuit. The logic circuit functions as an AND gate, producing an output signal indicative of whether each input signal is equal to 1.

1 Claim, 3 Drawing Sheets

METHOD AND CIRCUIT FOR FAST GENERATION OF ZERO FLAG CONDITION CODE IN A MICROPROCESSOR-BASED COMPUTER

BACKGROUND OF THE INVENTION

1. Field of the Invention

This invention relates to the field of microprocessors and more specifically to an improved method and circuit for generating condition codes in an arithmetic logic unit of a microprocessor.

2. Description of the Relevant Art

Microprocessors determine the speed and power of personal computers, and a growing number of more powerful machines, by handling most of the data processing in the machine. Microprocessors typically include at least three functional groups: the input output unit (I/O unit), the control unit, and the arithmetic-logic unit (ALU). The I/O unit interfaces between external circuitry and the ALU and the control unit. I/O units frequently include signal buffers for increasing the current capacity of a signal before the signal is sent to external components. The control unit controls the operation of the microprocessor by fetching instructions from the I/O unit and translating the instructions into a form that can be understood by the ALU. In addition, the control unit keeps track of which step of the program is being executed. The ALU handles the mathematical computations and logical operations that are performed by the microprocessor. The ALU executes the decoded instructions received from the control unit to modify data contained in registers within the microprocessor.

The computing power of a microprocessor can be increased by increasing the clock speed. Higher clock speeds, however, place design constraints on the circuit boards and interconnect circuits that interact with the microprocessor. Alternatively, increased computing power can be accomplished by maximizing the number of instructions that can be executed at a given speed and by minimizing the number of cycles during which the microprocessor is in a wait state. A wait state refers to a microprocessor cycle during which the microprocessor executes no instructions. Wait states can be required, for example, when the microprocessor must wait for data from an external device.

One source of undesired delay or wait states involves the generation of condition codes by the ALU. In a typical microprocessor, the ALU generates one or more condition codes each time it performs a mathematical or logical operation upon a set of operands. The condition codes indicate characteristics or attributes of the result produced by the mathematical or logical operation executed by the ALU. Condition codes are used to control branching, to monitor the accuracy of data, and to control a variety of other functions. One widely known example of a condition code is referred to as the zero flag. The zero flag is a special-purpose one bit register that is set when a mathematical or logical operation executed by the ALU produces a result equal to zero.

Many mathematical operations performed by the ALU proceed from the least significant bits of the operands to the most bits. For example, a typical ADD operation executed by a ripple-carry adder will add the least significant bit of a first operand to the least significant bit of a second operand to produce a least significant bit of result and a first carry bit. The first carry bit will then be added to the next most significant bit of the first operand and the next most significant bit of the second operand to produce an intermediate result bit and an intermediate carry bit. This sequence continues until, eventually, the most significant bits of the operands have been added together with the carry bit from the preceding sequence to produce the most significant bit of the result (and a carry out bit).

Reference to FIG. 1 will help clarify this example. In FIG. 1, a first operand 12 is added to a second operand 14 to produce the result 16 with a ripple-carry adder. First operand 12, second operand 14, and result 16 include n bits. Result 16 is produced by adding a least significant bit 12a of first operand 12 to a least significant bit 14a of second operand 14 to produce a least significant bit 16a of result 16 and a first carry bit 18. Next, first carry bit 18, intermediate significant bit 12b of first operand 12, and intermediate significant bit 14b of second operand 14 are added to produce intermediate significant result bit 16b and second carry bit 20. This procedure is repeated until finally, $n^{th}$-1 carry bit 24 is added to most significant bit 12n of first operand 12 and most significant bit 14n of second operand 14 to produce most significant bit 16n of result 16. As will be appreciated, least significant bit 16a of result 16 is generated prior to intermediate significant result bit 16b which, in turn is generated prior to most significant result bit 16n. Stated similarly, a finite but measurable period of time elapses between generation of least significant result bit 16a and most significant result bit 16n.

FIG. 2 shows a block diagram of an ALU execution unit 26 and an ALU condition code generation circuit 28. Execution unit 26 receives first operand 12 and second operand 14 together with instruction and control signals routed to the execution unit 26 over control bus 25. In response to the control signals and instruction signals contained on bus 25, execution unit 26 performs operations on first operand 12 and second operand 14 to produce result 16 as an output. The operations that execution unit 26 may perform on first operand 12 and second operand 14 include numerous instructions, such as the simple add instruction shown in FIG. 1. These operations frequently operate upon low order bit "a" of the respective operands 12 and 14 before the instruction operates on high order bit "n". As will be appreciated by those skilled in the art, the delay time between the generation of least significant result bit 16a and most significant result bit 16n in a conventional ripple-carry adder increases as the number of bits within first operand 12 and second operand 14 increases.

To address the delay time associated with ripple-carry adders, execution unit 26 can be designed with a fast adder circuit, such as a carry lookahead adder (CLA). The CLA reduces the delay time required to produce result 16 by reducing the number of logic levels needed to generate the most significant carry bit. Whereas the ripple-carry adder requires approximately 2N levels of logic to generate result 16, a practical CLA requires only approximately $\log_2 N$ logic levels where N is the number of bits. A description of ripple-carry adders and CLAs can be found in J. Hennessy & D. Patterson, *Computer Architecture a Quantitative Approach*, pp. A-2 to A-3 and A-31 to A-39 (Morgan Kaufmann 1990) [hereinafter "Hennessy"].

Regardless of the time required for execution unit 26 to produce result 16, conventional microprocessor-based systems do not begin to generate condition codes, including the zero flag, until result 16 has been calculated. Referring again to FIG. 2, condition code generation circuit 28 receives result 16 from execution unit 26 and produces a plurality of condition codes in response thereto. As stated previously, condition codes indicate characteristics of the result 16 after execution of the instruction by execution unit 26. The condition codes produced by execution unit 28 shown in FIG. 2 include those commonly found in x86 type microprocessors. These flags include the parity flag (PF), the zero flag (ZF), the carry flag (CF), the auxiliary carry flag (AF), the sign flag (SF), and the overflow flag (OF). The zero flag is generally set after each mathematical or logical operation whenever result 16 is equal to zero. The zero flag is frequently used to control the branching of computer programs. If, for example, it is desired to branch to a particular location or subroutine when first operand 12 is equal to second operand 14, the condition can be detected by subtracting first operand 12 from second operand 14 and checking the zero flag. If first operand 12 is equal to second operand 14, result 16 will be equal to zero and the zero flag will be set. Conditional branching based upon the value of the zero flag is well known in the art of microprocessor programming.

The generation of the zero flag is within the critical speed path of the program execution. Execution of subsequent program instructions is often dependent upon and, therefore, must await the determination of the zero flag. When program execution must wait for generation circuit 28 to generate a zero flag before subsequent execution can occur, the time required to generate the condition codes has a direct impact on the system performance. It would therefore be desirable to reduce or eliminate the delay between the generation of result 16 and the generation of the zero flag.

SUMMARY OF THE INVENTION

The problems noted above are in large part solved by an improved method and circuit for generating zero flag signals. The improved circuit comprises an adder circuit in parallel with a zero flag generation circuit. In one embodiment, the adder circuit and the zero flag generation circuit receive first and second operands as inputs. The adder circuit computes a result equal to the sum of the two operands. The zero flag generation circuit generates a zero flag signal which is set if the sum of the operands is equal to zero.

Broadly speaking, the present invention contemplates an arithmetic logic unit (ALU) circuit in a microprocessor based computer system. The ALU circuit includes an adder circuit preferably adapted to receive first and second operands. The preferred adder circuit is further adapted to produce a result equal to the sum of the first and second operands. The ALU circuit further comprises a zero flag generation circuit. The zero flag generation circuit is adapted to receive the first and second operands in parallel with the adder circuit and to produce a zero flag signal in response to the operands. The zero flag signal is indicative of whether the sum of the operands is equal to zero. In a presently preferred embodiment, the adder circuit includes a carry lookahead adder. In one embodiment, the zero flag generation circuit includes N half adders in parallel wherein each adder receives a bit from the first operand and a corresponding bit from the second operand. Each half adder produces a sum bit and a carry bit in response to the inputs. Preferably, the zero flag generation circuit further includes N-1 Exclusive OR (EXOR) gates. Each of the N-1 EXOR gates receives one bit of the N sum bits and a corresponding bit of the N carry bits as inputs. The N-1 outputs from the EXOR gates, together with an inverted least significant sum bit, are routed to a logic circuit. The logic circuit functions as an AND gate, producing an output signal indicative of whether each input signal is equal to 1.

The present invention further contemplates a method of generating a zero flag in a microprocessor based computer. In a presently preferred embodiment, the method includes providing of first and second operands to an adder circuit and to a zero flag generation circuit in parallel with the adder circuit. The zero flag generation circuit includes a half adder stage. The preferred method further includes the step of computing a result equal to the sum of the first and second operands with said adder circuit. The method further includes the step of computing a zero flag signal with the zero flag generation circuit. The zero flag signal indicates whether the sum of the operands is equal to zero. In a presently preferred embodiment, the half adder stage includes N half adders in parallel. Each of the half adders receives one bit from the first operand and a corresponding bit from the second operand. Each adder produces a sum bit and a carry bit in response to the inputs.

BRIEF DESCRIPTION OF THE DRAWINGS

Other objects and advantages of the invention will become apparent upon reading of following Detailed Description and upon reference to the accompanying drawings in which.

Figure 1:
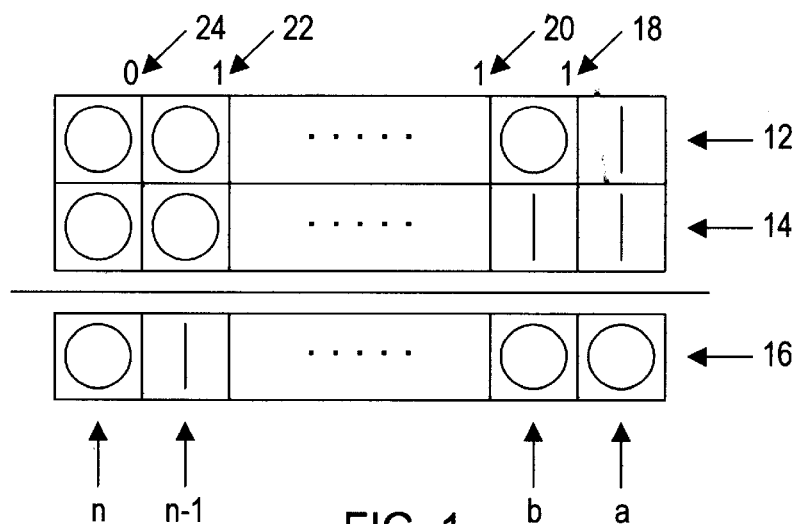
FIG. 1 is a diagram of a first operand and a second operand being added together to form a result.
Figure 2:
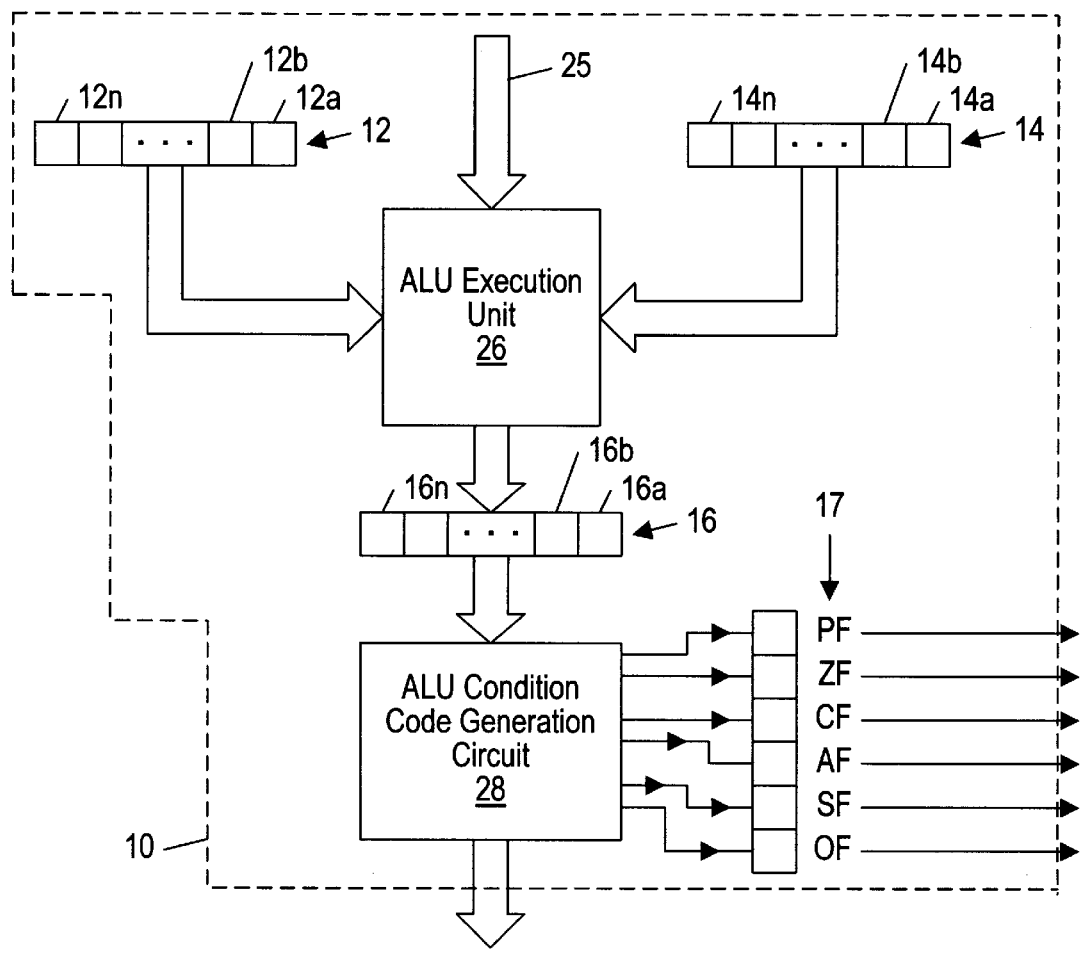
FIG. 2 is a block diagram of an arithmetic logic unit in which a state machine operates upon a first and second operand to produce a result which is then routed to a condition code generation circuit to produce values for a condition code register.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE DRAWINGS

Figure 3:
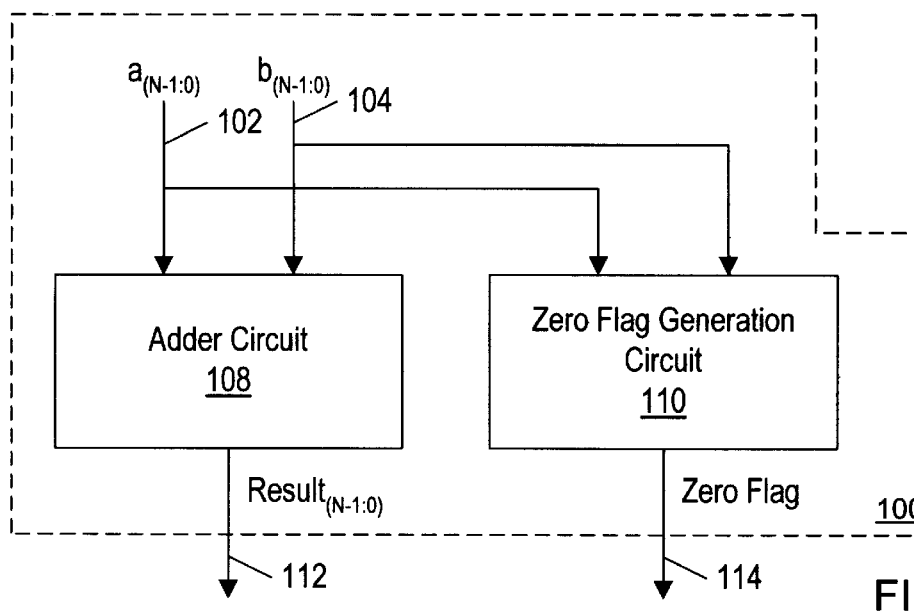
FIG. 3 is a block diagram of an arithmetic logic unit circuit having an adder circuit in parallel with a zero flag generation circuit.

Turning now to the figures, FIG. 3 shows arithmetic logic unit circuit 100 in accordance with the invention herein. ALU circuit 100 includes adder circuit 108 in parallel with zero flag generation circuit 110. In the presently preferred embodiment, adder circuit 108 and zero flag generation circuit 110 are adapted to receive first operand 102 and second operand 104. Adder circuit 108 is adapted to produce result 112 equal to the sum of first operand 102 and second operand 104. Adder circuit 108 is preferably comprised of a carry lookahead adder. It is to be understood however that adder circuit 108 could, alternatively, comprise any other type of adder circuit such as a ripple-carry adder. Zero flag generation circuit 110 is adapted to produce zero flag signal 114. Zero flag signal 114 is a special-purpose one bit signal indicating whether the sum of first operand 102 and second operand 104 is equal to zero. If the sum of first operand 102 and second operand 104 is equal to zero, zero flag generation circuit 110 sets zero flag 114. As will be appreciated by those skilled in the art, ALU circuit 110 generates zero flag signal 114 in parallel with the generation of result 112. Because zero flag signal 114 is generated during the time that adder circuit 108 is calculating result 112, the delay time from the generation of result 112 to the generation of zero flag 114 is reduced or eliminated entirely thereby minimizing the number of wait states and improving system performance. In the embodiment shown in FIG. 3, first operand 102, second operand 104, and result 112 all contain N bits.

Figure 4:
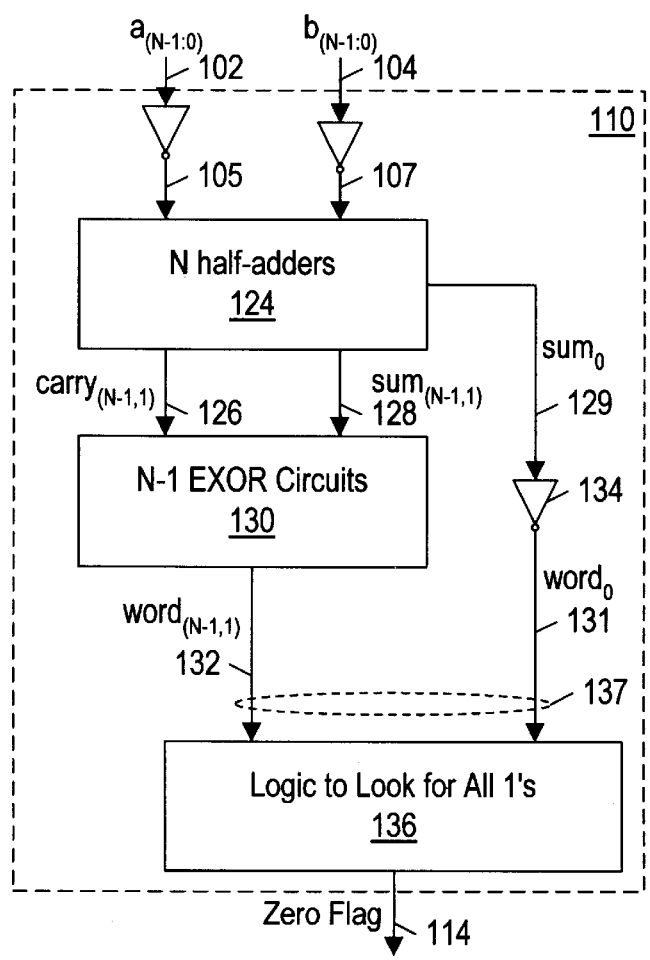
FIG. 4 is a partial block diagram of a preferred embodiment zero flag generation circuit of FIG. 3; and, FIG. 5 is an illustrative example of the zero flag generation circuit shown in FIG. 4.

Turning now to FIG. 4, a presently preferred embodiment of zero flag generation circuit 110 is depicted. Zero flag generation circuit 110 receives first operand 102 and second operand 104. First operand 102 and second operand 104 are complemented by inverters 120 and 122 respectively to produce complemented first operand 105 and complemented second operand 107. Complemented first operand 105 and complemented second operand 107 comprise the inputs for half-adder stage 124 of zero flag generation circuit 110. Half-adder stage 124 includes N half adders in parallel. Each half adder within half-adder stage 124 receives one bit from complemented first operand 105 and a corresponding bit of complemented second operand 107 as inputs. As is well known in the art, a half adder produces two output signals in response to two input signals. The first output signal from a half adder circuit, referred to as the sum output, is set to 1 if either but not both, of the input signals is equal to 1. The second output signal, known as the carry output, is set to 1 if both of the inputs are set to 1. Half adders are discussed in greater detail in Appendix A of Hennessy. (In another embodiment, the half adders of zero flag generation circuit 110 may be replaced with 3-input full adders to permit expansion to 3 input operands. In such an embodiment the third input terminal of each full adder may be set to zero when only two input operands are present.) Accordingly, the N half adders in full-adder stage 124 produce an N-bit sum signal 128 and an N-1 bit carry signal 126. (Carry signal 126 contains only N-1 bits of interest because the highest carry bit is ignored).

FIG. 4 shows carry signal 126 and sum signal 128 being produced by full-adder stage 124 and routed to EXOR circuit 130. EXOR circuit 130 includes N-1 EXOR gates in parallel. Each EXOR gate within EXOR circuit 130 receives one bit from sum signal 128 and a corresponding bit from carry signal 126 as inputs. Each EXOR gate within EXOR circuit produces a signal which is equal to 1 if the two input signals are dissimilar. In other words, the output of a two input EXOR gate is equal to 1 if either, but not both, of the input signals is equal to 1. The least significant bit of sum signal 128 ($sum_0$) has no corresponding carry signal bit. Accordingly, $sum_0$ 129 is simply routed to inverter 134 to produce $word_0$ 131, (the least significant bit of word signal 137). The remaining N-1 bits of word signal 137, shown in FIG. 4 as reference 132, are generated by EXOR circuit 130. Word signal 137 is routed to logic circuit 136. Logic circuit 136 is adapted to produce a one bit signal indicative of whether each input signal is set to 1. If each bit within word signal 137 is set to 1, then the sum of first operand 102 and second operand 104 is equal to zero and, therefore, zero flag signal 114 should be set to 1. As will be appreciated by those skilled in the art of digital logic design, circuit 136 simply functions as a multi-input AND gate although the specific implementation of circuit 136 may include a series of stages. Moreover, although the embodiment depicted includes a zero flag signal 114 that is set to logical 1 when an operation produces a zero result, no particular polarity for zero flag signal 114 nor word 137 should be implied. In other words, with appropriate logic, zero flag signal 114 might be set to logical 0 to indicate a zero result.

Figure 5:
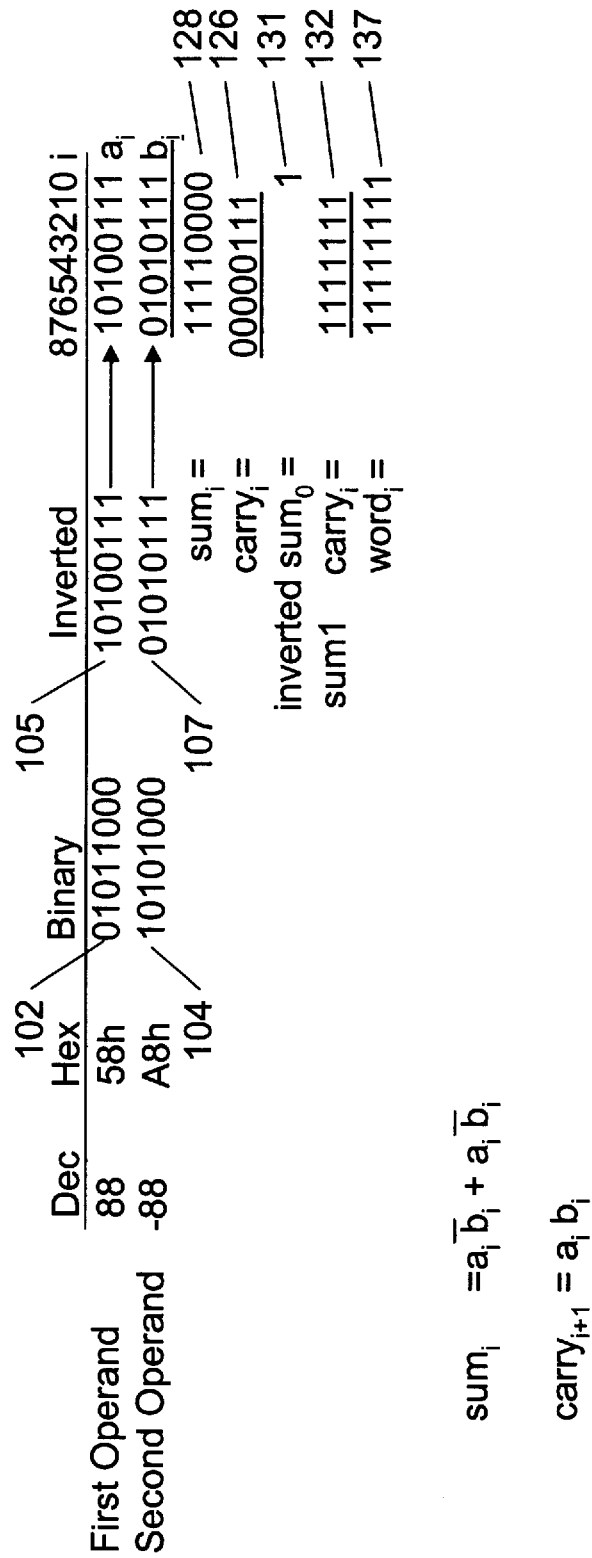

Turning to FIG. 5, an illustrative example of the operation of zero flag generation circuit 110 is depicted. In the specific embodiment exemplified in FIG. 5, the number of bits N is equal to 8. It is to be understood however that the number of bits N can theoretically be any number and will more commonly be equal to 16, 32, or more. In the example shown in FIG. 5, first operand 102 is equal to 88 and second operand 104 is equal to −88. It will be appreciated that the digital value of second operand 104 is represented in the well known 2's complement format. Because the sum of first operand 102 and second operand 104 is equal to zero, zero flag generation circuit 110 (shown in FIG. 4) should set zero flag signal 114 in response to receiving the two operands. Preliminarily, first operand 102 and second operand 104 are complemented by inverters 120 and 122 (FIG. 4) respectively to produce complemented first operand 105 and complemented second operand 107. Complemented first operand 105 and complemented second operand 107 are then routed to full-adder stage 124 (FIG. 4) which produces sum signal 128 and carry signal 126. Least significant bit of sum signal 128 is inverted to form a least significant bit 131 of word signal 137. The remaining bits of sum signal 128 are EXOR'ed with their corresponding bits of carry signal 126 to produce the remaining bits of word signal 137. As seen in this example, combining the inverted least significant bit 131 of sum signal 128 with the bits produced by EXOR circuit 130 (FIG. 4) results in word signal 137 wherein each bit is set to 1. Logic circuit 136 will, therefore, set zero flag 114 in response to word signal 137.

It will be appreciated to those skilled in the art having the benefit of this disclosure that this invention is generally useful for producing a zero flag in parallel with the generation of an arithmetic operation. Furthermore, it is also to be understood that the form of the invention shown and described is to be taken as exemplary, presently preferred embodiments. Obvious modifications and changes may be made without departing from the spirit and scope of the invention as set forth in the claims. It is intended that the following claims be interpreted to embrace all such modifications and changes.

What is claimed is:

1. An arithmetic logic unit circuit, comprising:

an adder circuit adapted to receive a first operand and a second operand and to produce an output indicative of a sum of said first second operands; and a zero flag generation circuit adapted to receive said first and second operands in parallel with said adder circuit and to produce a zero flag signal in response thereto, wherein said zero flag signal is indicative of whether the sum of said first and second operands is equal to zero, wherein said zero flag generation circuit comprises:

an inverter stage coupled to receive and complement said first and second operands, wherein each said first and second operands comprise N bits;

a half-adder stage coupled to receive the outputs of said first and second inverters, wherein said half-adder stage outputs N sum bits and N-1 carry bits, wherein no carry bit is output for the most significant corresponding bit pair of said first and second operands;

an EXOR stage coupled to receive N-1 of said N sum bits and to receive said N-1 carry bits, wherein said EXOR stage EXORs each N-1 sum bit to the corresponding N-1 carry bit and produces N-1 bits of an N bit word;

an inverter coupled to receive the least significant bit of said N sum bits and output the least significant bit of said N bit word; and a logic stage coupled to receive said N bit word and adapted to produce a one bit signal indicative of whether each bit of said N bit word is set.

* * * * *